April 13, 1954           S. KRASNOW           2,675,481
BOREHOLE RADIOACTIVITY SYSTEM UTILIZING
RADIO SIGNAL TRANSMISSION
Original Filed Oct. 24, 1939
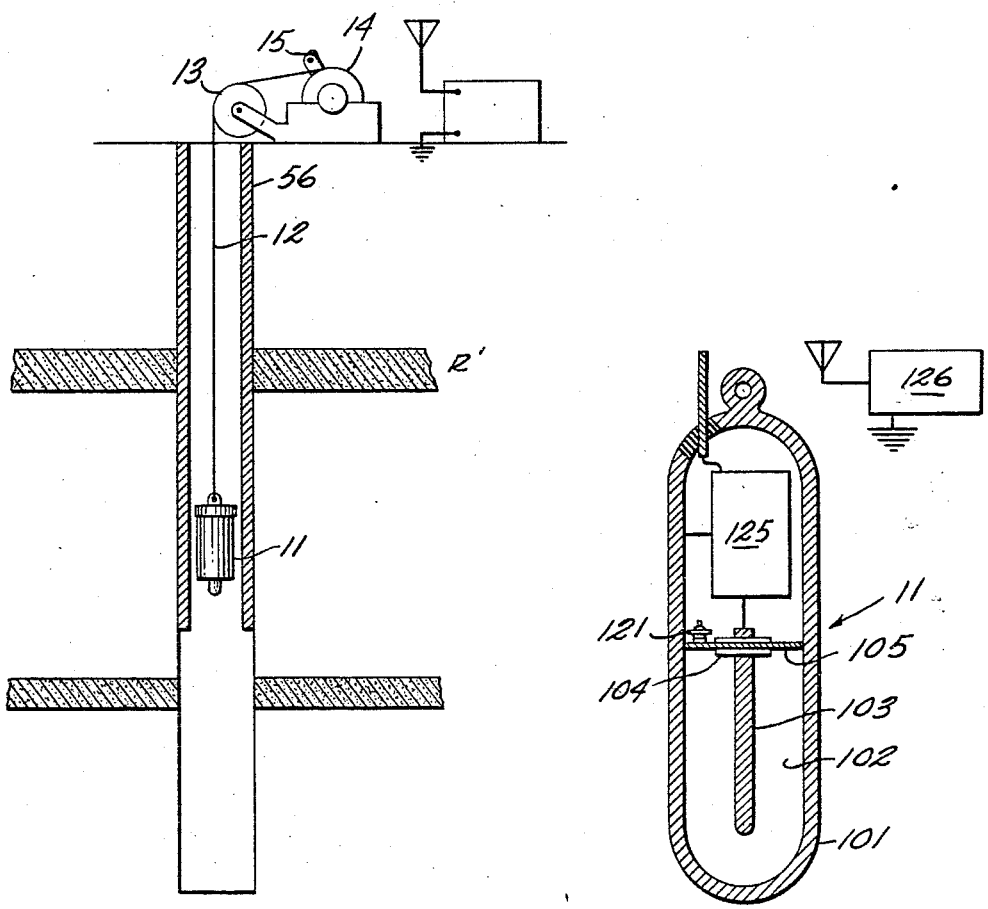
FIG. I.          FIG. 2.
INVENTOR.
SHELLEY KRASNOW
BY
his ATTORNEYS Patented Apr. 13, 1954

2,675,481

UNITED STATES PATENT OFFICE 2,675,481

BOREHOLE RADIOACTIVITY SYSTEM UTILIZING RADIO SIGNAL TRANSMISSION

Shelley Krasnow, New York, N. Y., assignor to Schlumberger Well Surveying Corporation, Houston, Tex., a corporation of Texas Original application October 24, 1939, Serial No. 301,078. Divided and this application March 21, 1951, Serial No. 223,092

8 Claims. (Cl. 250—83.3)

This invention relates to an improved method and apparatus for measuring radioactivity, and has particular reference to a method and apparatus for measuring radioactivity in inaccessible locations, such as in bore-holes or at considerable depths in bodies of water.

This application is a division of copending application Serial No. 301,078, filed October 24, 1939, for "Method and Apparatus for Measuring Radioactivity," now Patent No. 2,590,873, issued April 1, 1952.

One object of the invention is to provide a method and apparatus useful for locating deposits of minerals having radioactive properties. Another object of the invention is to provide an apparatus by which one may measure radioactive properties continuously from the top to the bottom of a bore-hole, and have both an immediate indication, and a permanent record, of the radioactivity at various depths.

In locating deposits of radioactive minerals it is often the custom to drill a number of bore-holes in localities where such deposits might exist. It is further the practice to bring samples or cores of the drilled material to the surface of the earth, and there examine them for radioactivity by well known methods and apparatus. This method has several drawbacks. First, a deposit of ore may exist close to the bore-hole, but not be traversed by it, by which the deposit will be missed. Second, it is possible to make an error in ascertaining the exact depth from which a core or sample has been taken. Finally, it is rarely possible to bring all of the core to the surface, a certain percentage always being lost in the drilling or handling.

It is further known that deposits of petroleum are often markedly radioactive as compared with the surrounding rock material. This is believed to be due to the superior absorptive property of petroleum for radium emanation. Natural gas and ground water are also known to be somewhat more radioactive than their surrounding rock material. In drilling for either petroleum or natural gas, or ground water, it is desirable to know the exact level at which the strata having these are traversed by the drilled hole. This is often difficult to determine, particularly when drilling has been done by the "rotary" method, in which the use of mud under pressure tends to wall off the strata. Often too, the drilled hole will be lined with a metallic casing, which casing by accident or intention may seal off strata having the desired fluid.

It is the intention in the present invention to provide an apparatus so sensitive, and a method appropriate to its use, that the relatively faint radioactivity of oil and ground water may be detected in place in a bore-hole. An apparatus sensitive enough to serve this function will by its nature differentiate between the different though faint radioactivities of the rock material. Rock materials, depending upon their origin and dependent upon the minerals contained in them, have different radioactivities. Thus, it has been found that granite, shales having organic materials embodied therein, sedimentary rocks containing zircon, and rock materials having mica associated with them, are all slightly more radioactive than for example limestone or chalk deposits. Sandstones will differ in their natural radioactivity, depending upon the minerals contaminating them. Organic deposits, such as coal, oil and natural gas, as mentioned above, petrified vegetable matter, etc., will show higher radioactivities than for instance limestone and chalk. Thus, with an apparatus as sensitive as that described herein it will be possible to differentiate between different layers of rock by the differences in their radioactivities. Each layer in an area will have a characteristic radioactivity, just as it has a characteristic chemical composition, and for the same reason. Thus, the radioactivity of a layer will serve as a variety of marker, serving to identify the layer wherever it might be in an area.

It thus becomes possible to identify rock layers in different bore-holes drilled in an area and thus correlate the strata.

Further objects of the invention described are to obviate the difficulties mentioned and secure the advantages mentioned above.

Reference is had to the accompanying drawings in which:

Fig. 1 is a diagrammatic showing of radioactivity logging apparatus for use in a bore hole; and Fig. 2 illustrates schematically the bore hole apparatus of the system shown in Fig. 1.

In the form of the apparatus shown in Figure 1 a cartridge 11 is suspended in the bore-hole by a conducting cable 12. The cable 12 passes over a measuring wheel 13 and thence onto a reel 14 operated by a crank 15.

A measuring apparatus which may be employed in the cartridge 11 is shown in Figure 2. This consists of a cartridge 101, which is provided with a gas-tight partition 105 and a gas-filled space 102. Located preferably centrally within the space 102 is an electrode 103, carefully insulated by means of amber or other low leakage insulating material 104. In the partition 105 is mounted a valve 121 by which gas may be introduced to attain any desired pressure within the enclosure 102, after which the valve 121 may be shut and the said pressure maintained. The wall 101 is made of strong material, as thin as possible to reduce the absorption of rays of radioactive material passing into the space 102. A material which will combine strength and transparency to rays from radioactive substances is utilized. Suitable materials are: magnesium alloys, aluminum alloys such as duralumin, beryllium, or beryllium alloys. A very thin steel housing may be used, the greater strength allowing the material to be so thin that absorption is not serious. The space 102 may be filled with any one of a number of gases. A suitable gas for this purpose is nitrogen, although other gases may be used with almost equally good results.

It is of advantage to rib or corrugate the surface of the insulation as shown, to increase the leakage path. Although element 121 is shown as a valve, in practice it may be advantageous to use a standard type of sealed-off glass joint, as employed in the glass blowing art.

The pressure in the ionization chamber is preferably higher than atmospheric so as to give a greater ionization current, as will be familiar to those versed in the art. A pressure of several hundred pounds per square inch will be found suitable. The voltage across the chamber is made as high as possible so as to obtain an increased ionization for a given change in intensity of ionizing rays. The voltage is limited, however, by the fact that if it is made too high, ionization by collision will result and the chamber will support a steady discharge regardless of the intensity of ionizing rays in its vicinity.

The central electrode 103 of the ionization chamber is connected to an element 125 serving to generate radio signals, which signals pass to the surface of the earth where they are detected and their frequency measured. The receiving apparatus is shown schematically as 126 and will be of a type familiar to those versed in the art. This operates on a frequency measuring apparatus which may also record the frequency. By means of the reel 13 which is used to lower the apparatus, the depth at any moment can be told and correlated with the indicated frequency.

In cases in which the apparatus described above is used, it will be understood that measurements in a dry bore-hole will ordinarily be contemplated. In order to make this technique most effective, it will be preferable to employ a radio wave of wave length comparable with the diameter of the bore-hole. With such a wave length, the bore-hole will act as a type of tube guiding the radio waves to the top of the hole. Such a modification will operate even though the bore-hole be filled, or partially filled, with liquid.

If a metallic casing such as 56 exists in the bore hole, the presence of a radioactive layer, such as R', may, nevertheless, be noted because of the easy penetration of the rays through the thickness of metal ordinarily employed for casing.

The scope of the invention is defined by the appended claims:

1. In a method for transmitting to the earth's surface a signal output generated by apparatus in a bore hole, the steps of generating in the bore hole an electromagnetic wave having a wavelength comparable with the bore hole diameter, modulating said wave as a function of the signal output from said apparatus, and utilizing the bore hole as a wave guide for propagation of said modulated wave to the surface.

2. In a method for logging bore holes by geophysical exploring means and the like, the steps of generating in the bore hole an electromagnetic wave having a wavelength comparable with the diameter of the bore hole, modulating said wave as a function of the response of said geophysical exporing means, utilizing the bore hole as a wave guide for propagation of said wave to the surface, detecting said wave at the surface, and exhibiting a function of the modulation component of said wave.

3. In a method for logging bore holes with a radioactivity responsive element, the steps of generating in the bore hole an electromagnetic wave having a wavelength comparable with the diameter of the bore hole, modulating said wave as a function of the response of said element, utilizing the bore hole as a wave guide for propagation of said modulated wave to the surface, detecting said wave at the surface, and exhibiting a function of the modulation component of said wave.

4. In a method for logging bore holes with a radioactivity responsive element, the steps of generating in the bore hole an electromagnetic wave having a wavelength comparable with the diameter of the bore hole, modulating the frequency of said wave as a function of the response of said element, utilizing the bore hole as a wave guide for propagation of said modulated wave to the surface, detecting said wave at the surface, and exhibiting a function of the frequency of said wave.

5. Bore hole logging apparatus comprising a geophysical exploring device adapted to be lowered into a bore hole, means movable through the bore hole with said device for generating a radio frequency carrier signal having a wavelength comparable with the diameter of the bore hole, means for modulating said carrier signal as a function of the response of said device, means for radiating an electromagnetic wave representative of said modulated carrier signal through the bore hole serving as a wave guide, and receiver means at the surface responsive to said wave for exhibiting a function of the modulation carried thereby.

6. Bore hole logging apparatus comprising a geophysical exploring device adapted to be lowered into a bore hole, means movable through the bore hole with said device for generating a radio frequency carrier signal having a wavelength comparable with the diameter of the bore hole, means for modulating the frequency of said carrier signal as a function of the response of said device, means for radiating an electromagnetic wave representative of said modulated carrier signal through the bore hole serving as a wave guide, and receiver means at the surface responsive to said wave for exhibiting a function of the frequency thereof.

7. Bore hole radioactivity logging apparatus comprising a radioactivity sensitive element adapted to be lowered into a bore hole, means movable through the bore hole with said element for generating a radio frequency carrier signal having a wavelength comparable with the diameter of the bore hole, means for modulating said carrier signal as a function of the response of said element, means for radiating an electromagnetic wave representative of said modulated carrier signal through the bore hole serving as a wave guide, and receiver means at the surface responsive to said wave for exhibiting a function of the modulation carried thereby.

8. Bore hole radioactivity logging apparatus comprising a radioactivity sensitive element adapted to be lowered into a bore hole, means movable through the bore hole with said element for generating a radio frequency carrier signal having a wavelength comparable with the diameter of the bore hole, means for modulating the frequency of said carrier signal as a function of the response of said element, means for radiating an electromagnetic wave representative of said modulated carrier signal through the bore hole serving as a wave guide, and receiver means at the surface responsive to said wave for exhibiting a function of the frequency thereof.

References Cited in the file of this patent

UNITED STATES PATENTS

| Number | Name | Date |
| --- | --- | --- |
| 2,106,725 | Curtis | Feb. 1, 1938 |
| 2,106,770 | Southworth et al. | Feb. 1, 1938 |
| 2,219,653 | Krugel | Oct. 29, 1940 |
| 2,225,668 | Subkow et al. | Dec. 24, 1940 |